(12) United States Patent
Kitagawa

(10) Patent No.: US 6,884,506 B2
(45) Date of Patent: Apr. 26, 2005

(54) POLYBENZAZOLE FIBER

(75) Inventor: Tooru Kitagawa, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/492,480

(22) PCT Filed: Oct. 11, 2002

(86) PCT No.: PCT/JP02/10570

§ 371 (c)(1),
(2), (4) Date: Oct. 7, 2004

(87) PCT Pub. No.: WO03/033785

PCT Pub. Date: Apr. 24, 2003

(65) Prior Publication Data

US 2005/0045545 A1 Mar. 3, 2005

(30) Foreign Application Priority Data

Oct. 12, 2001 (JP) ........................................ 2001-315784

(51) Int. Cl.$^7$ .................................................. D01F 6/00
(52) U.S. Cl. ........................ 428/372; 428/364; 428/394; 428/359
(58) Field of Search .................................. 428/372, 364, 428/394, 359

(56) References Cited

FOREIGN PATENT DOCUMENTS

| EP | 1449942 A1 | * | 8/2004 |
| JP | 20031119622 A | * | 4/2003 |
| JP | 2003231810 A | * | 8/2003 |
| JP | 2003327722 A | * | 11/2003 |
| WO | WO 03/033785 A1 | * | 4/2003 |

* cited by examiner

Primary Examiner—N. Edwards
(74) Attorney, Agent, or Firm—Morrison & Foerster LLP

(57) ABSTRACT

A polybenzazole fiber having a compression strength is not less than 0.5 GPa, which contains a carbon nanotube having an outer of not more than 20 nm and a length of 0.5 $\mu$m–10 $\mu$m inside the fiber in a proportion of 1–15% by weight. Such polybenzazole fiber has conventionally unavailable high strength and high elastic modulus at the same time, as well as a specific fine fiber structure, and is useful as various industrial materials.

5 Claims, No Drawings

POLYBENZAZOLE FIBER

TECHNICAL FIELD

The present invention relates to a polybenzazole fiber markedly superior in compression strength, which is preferable as an industrial material.

BACKGROUND ART

Polybenzazole fibers have not less than twice the strength and elastic modulus of polyparaphenylene terephthalamide fiber, which is a representative super fiber currently on the market, and is expected to be a super fiber of the next generation.

It is conventionally known that fibers are produced from a solution of polybenzazole polymer in polyphosphoric acid. For example, U.S. Pat. No. 5,296,185 and U.S. Pat. No. 5,385,702 disclose spinning conditions, WO94/04726 discloses water washing and drying methods, and U.S. Pat. No. 5,296,185 discloses heat treatment methods.

However, the compression strength of high strength polybenzazole fibers according to the above-mentioned conventional production methods is generally 0.4 GPa at most. This has become a threshold in applying a polybenzazole fiber to composite materials used in aircraft and the like.

Thus, the present inventor has conducted intensive studies in an attempt to develop a technique- to easily produce a polybenzazole fiber having an ultimate elastic modulus as an organic fiber material.

As a means to realize ultimate physical property of the fiber, rigid polymers such as so-called ladder polymer have been considered. However, such rigid polymers lack flexibility, and therefore, it is essential to use a linear polymer to afford soft touch as organic fiber and workability.

As shown by S. G. Wierschke et al. in Material Research Society Symposium Proceedings Vol. 134, p. 313 (1989), it is polyparaphenylene benzobisoxazole in cis-form that has the highest theoretical elastic modulus in linear polymers. This conclusion was also confirmed by Tashiro et al. (Macromolecules. vol. 24, p. 3706 (1991)), wherein, of polybenzazoles, cis-form polyparaphenylene benzobisoxazole showed a crystalline elastic modulus of 475 GPa (P. Galen et al., Material Research Society Symposium Proceedings Vol. 134, p. 329 (1989)), and was considered to have an ultimate primary structure. Accordingly, it is a theoretical conclusion to use, as a polymer, polyparaphenylene benzobisoxazole as a material to achieve an ultimate elastic modulus.

The polymer is fiberized according to the methods described in U.S. Pat. No. 5,296,185 and U.S. Pat. No. 5,385,702, and the heat treatment is performed according to the methods proposed in U.S. Pat. No. 5,296,185, but a yarn obtained according to these methods has a compression strength of 0.4 GPa at most. Therefore, the necessity of research of modification of these methods was keenly realized and the present inventor has found that the expected physical properties can be easily achieved industrially by the method shown below.

DISCLOSURE OF THE INVENTION

Accordingly, the present invention has the following constitution.
1. A polybenzazole fiber comprising a carbon nanotube inside the fiber.
2. The polybenzazole fiber of 1. above, wherein the content of the carbon nanotube is 1~15% in weight proportion.
3. The polybenzazole fiber of 1. above, wherein the carbon nanotube has an outer diameter of not more than 20 nm and a length of 0.5 $\mu$m –10 $\mu$m.
4. The polybenzazole fiber of 1. above, wherein the Raman shift factor ascribed to $A_{1g}$ of the carbon nanotube is not more than –0.5 $cm^{-1}$/GPa.
5. The polybenzazole fiber of 1. above, wherein the compression strength is not less than 0.5 GPa.

The present invention is described in detail in the following.

For expression of the above-mentioned structural characteristics, the point of the present invention can be realized by a comparatively simple method shown in the following. To be specific, after having extracted phosphoric acid contained in a spun yarn by introducing the yarn into an extraction (coagulation) bath, which yarn was obtained by extruding, from a spinneret, a dope of a polymer made from polyparaphenylene benzobisoxazole for a fiber comprising carbon nanotube uniformly dispersed therein, into a non-coagulative gas, the yarn is dried and wound up. When an elastic modulus of the fiber needs to be increased, it can be achieved by further applying a heat treatment under tension at a temperature of not lower than 500° C.

In the present invention, a polybenzazole fiber refers to a polybenzoxazole (PBO) homopolymer, random, sequential or block copolymers with polybenzazoles (PBZ) that substantially contain not less than 85% of a PBO component, and the like The polybenzazole (PBZ) polymer is described in, for example, Wolf et al., "Liquid Crystalline Polymer Compositions, Process and Products", U.S. Pat. No. 4,703, 103 (Oct. 27, 1987), "Liquid Crystalline Polymer Compositions., Process and Products" U.S. Pat. No. 4,533, 692 (Aug. 6, 1985), "Liquid Crystalline Poly(2,6-Benzothiazole) Compositions, Process and Products", U.S. Pat. No. 4,533,724 (Aug. 6, 1985), "Liquid Crystalline Polymer Compositions, Process and Products"., U.S. Pat. No. 4,533,693 (Aug. 6, 1985), Evers, "Thermooxidatively Stable Articulated p-Benzobisoxazole and p-Benzobisoxazole Polymers", U.S. Pat. No. 4,539,567 (Nov. 16, 1982), Tsai et al., "Method for Making Heterocyclic Block Copolymer", U.S. Pat. No. 4,578,432 (Mar. 25, 1986), and the like.

The carbon nanotube mentioned here is a tubular compound substantially made of carbon, wherein the layer may be a monolayer or multi-layer and the number of layers is not limited. As the production method thereof, are discharge methods, vapor growth methods and the like are known (JP-A-2001-80913), but a carbon nanotube used may be obtained by any method. The outer diameter is not more than 20 nm and the length is not less than 0.5 $\mu$m and not more than 10 $\mu$m, preferably not less than 1 $\mu$m and not more than 5 $\mu$m. When the outer diameter is 20 nm or the length is 10 $\mu$m, uniform dispersion in a fiber is difficult to achieve as mentioned below, which in turn unpreferably causes lower strength of completed yarn. When the length is 0.5 $\mu$m, the carbon nanotube is not sufficiently oriented in the fiber axis direction in the spinning step and does not contribute to the improvement of the compression strength, which is not preferable.

The structural unit contained in the PBZ polymer is preferably selected from lyotropic liquid crystal polymers. The monomer unit comprises a monomer unit described in any of the structural formulas (a)–(h), more preferably a monomer unit essentially selected from the structural formulas (a)–(d).

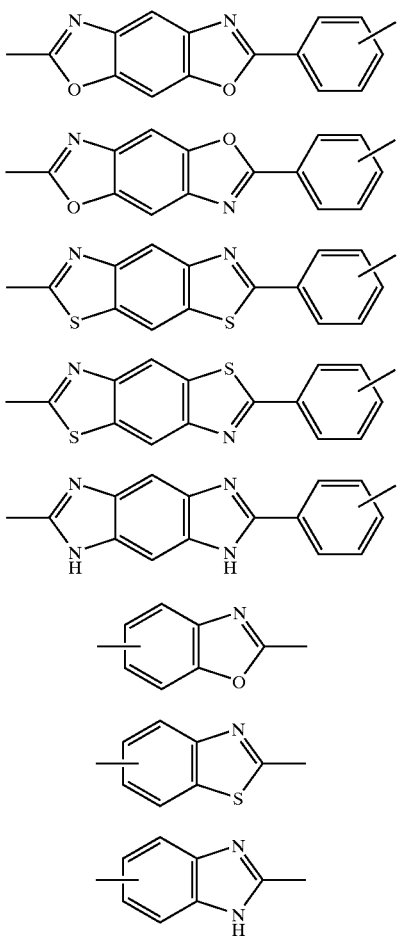

A preferable solvent for forming a dope of a polymer substantially made from PBO includes creosol and non-oxidative acids capable of dissolving the polymer. Examples of preferable acid solvents include polyphosphoric acid, methanesulfonic acid, high concentration sulfuric acid and a mixture thereof. More suitable solvents include polyphosphoric acid and methanesulfonic acid. The most suitable solvent is polyphosphoric acid.

The polymer concentration of the solvent is preferably at least about 7 weight %, more preferably at least 10 weight %, most preferably 14 weight %. The highest concentration is limited by practical handling property such as solubility of polymer and viscosity of dope. Due to such limiting factors, the polymer concentration does not exceed 20 weight %.

Preferable polymers and copolymer or dope are/is synthesized by known methods. For example, synthesis is performed according to the methods described in U.S. Pat. No. 4,533,693 (Aug. 6, 1985) to Wolfe et al., U.S. Pat. No. 4,772,678 (Sep. 20, 1988) to Sybert et al. and U.S. Pat. No. 4,847,350 (Jul. 11, 1989) to Harris. According to U.S. Pat. No. 5,089,591 (Feb. 18, 1992) to Gregory et al., a polymer substantially made from PBO can be made to have a high molecular weight at a high reaction speed in a dehydrative acid solvent at comparatively high temperature under high shear condition.

The carbon nanotube to be added is simultaneously mixed with dope materials when the dope is synthesized. For the expression of fine fiber dynamic physical property, uniform mixing and dispersion of carbon nanotube in a dope is necessary. It is preferable to place the materials before polymerizing the dope, once stir to mix the starting materials at a temperature not higher than 80° C. and prepare the dope according to the information. The amount of addition is 1–15%, preferably not less than 3% and less than 10% in weight proportion relative to the amount of monomer charged. When the amount is smaller, the amount of the carbon nanotube contained in the completed yarn becomes smaller and improvement of compression strength cannot be expected. When the amount is too much, dispersing property of the carbon nanotube in the fiber becomes poor and unpreferably decreases the strength of the completed yarn.

The dope thus polymerized is fed to a spinning part and discharged from a spinneret generally at a temperature of not lower than 100° C. The arrangement of the holes of a spinneret is generally circular or lattice in plurality, but may be a different arrangement. While the number of the holes of a spinneret is not particularly limited, the density of the holes of a spinneret needs to be one that is free from welding and the like of the discharged yarns.

The spun yarn requires a draw zone having a sufficient length to achieve a sufficient draw ratio (SDR) and desires uniform cooling with a rectified cooling air having a comparatively high temperature (not less than solidification temperature of dope and not higher than spinning temperature), as described in U.S. Pat. No. 5,296,185. The length (L) of the draw zone needs to be sufficient to allow completion of solidification in a non-coagulative gas and is largely determined based on discharge volume (Q) of one hole. To achieve fine fiber property, take-up stress of the draw zone needs to be not less than 2 g/d based on polymer (assuming that the stress is applied on polymer alone).

The yarn drawn in the draw zone is then led to an extraction (coagulation) bath. Because spinning tension is high, disturbance of an extraction bath and the like do not matter, and any type of extraction bath can be used. For example, a funnel type, a tank type, an aspirator type, a cascade type and the like can be used. For extraction solution, an aqueous phosphoric acid solution and water are desirable. Finally, not less than 99.0%, preferably not less than 99.5% of the phosphoric acid contained in the yarn is extracted in an extraction bath. While the liquid to be used as an extraction medium in the present invention is not particularly limited, water, methanol, ethanol, acetone and the like, which are substantially incompatible with polybenzoxazole, are preferable. It is also possible to separate the extraction (coagulation) bath in multiple steps, wherein the concentration of the aqueous phosphoric acid solution is serially diluted to ultimate washing with water. Furthermore, it is desirable to neutralize a fiber bundle with an aqueous sodium hydroxide solution and the like and wash it with water.

To improve the compression strength, the longer axis of the carbon nanotube should be oriented in the fiber axis direction in a fiber, as well as uniformly dispersed therein. Only then the carbon nanotube functions as a support relative to the deformation in the compression direction. As a result of intensive investigation, it has been found that this structure generally develops spontaneously when carbon nanotube is uniformly dispersed in a dope, by undergoing a conventional spinning step. Whether the carbon nanotube functions as a dynamic support can be examined by Raman scattering method.

That is, intensive investigation has revealed that fine compression property is observed when a Raman shift factor ascribed to $A_{1g}$ of carbon nanotube is not more than −0.5 cm$^{-1}$/GPa, preferably not more than −1.0 cm$^{-1}$/GPa. The Raman band of $A_{1g}$ is also called a D' band, and observed near 2610 cm$^{-1}$. As used herein, by the Raman shift factor is meant a Raman band shift that varies upon application of 1 GPa stress on the fiber.

In general, when a molecule is deformed by a stress, a Raman shift occurs due to anharmonicity of force constants for connecting bonds. Actual observation of Raman shift is considered to be evidence of function of a macroscopic stress applied to the fiber working on the carbon nanotube in microscopic level as well.

When the longer axis of the carbon nanotube is not sufficiently oriented in the fiber axis direction or the carbon nanotube is not uniformly dispersed in the fiber, the macroscopic stress applied to the fiber fails to uniformly applies to carbon nanotube in the fiber, thus preventing observation of sufficient Raman shift. This can be also said about the compression direction, and it is understood that the force applied in the compression direction cannot be sufficiently accepted by the carbon nanotube microscopically, and as a result, high compression property is not shown.

(Measurement Method of Raman Shift)

The Raman scattering spectrum was measured by the following method. As a Raman measurement instrument (spectrometer), system 1000 of Renishaw plc was used. As the light source, helium-neon laser (wavelength 633 nm) was used, and the fiber was set such that the fiber axis is in parallel to the direction of polarization and measurement was done. A monofilament was split and picked up from a yarn, put on the center part of a rectangular (length 50 mm width 10 mm) hole placed in a cardboard, so that the longer axis can be identical to the fiber axis, the both ends were adhered with an epoxy adhesive (Araldite), and left standing for two days or longer. Then the fiber was set on an apparatus capable of adjusting the length with a micrometer. The cardboard carrying the monofilament was carefully cut out and a deformation was applied to the fiber. The fiber was placed on a microscope stage of the Raman spectrometer and the Raman spectrum was measured. The stress acting on the fiber was simultaneously measured using a load cell.

(Measurement Method of Compression Strength)

The compression strength was measured using the Raman scattering mentioned above. The detail of the measurement followed the method of Young et al., such as Polymer 40, 3421 (1999). The compression strength was determined by monitoring changes in the 1619 cm$^{-1}$ band due to the stretching of benzene ring of PBO.

While Examples are shown in the following, the present invention is not limited by these Examples.

BEST MODE FOR EMBODYING THE INVENTION

Comparative Examples 1–7

A spinning dope made from polyparaphenylene benzobisoxazole (14.0 weight %), which has an intrinsic viscosity of 24.4 dL/g as measured in a methanesulfonic acid solution at 30° C. and which was obtained according to the method described in U.S. Pat. No. 4,533,693, and polyphosphoric acid containing 83.17% of phosphorus pentoxide was used for spinning. The dope was passed through a metal mesh filtering medium and kneaded and defoamed in a biaxial kneading device. The pressure was raised, the polymer solution was spun out from a spinneret having 166 holes at 170° C. while maintaining the temperature of the solution at 170° C., the discharged yarn was cooled with a cooling air at 60° C., wound around a godet roll to give a spinning speed, and introduced into an extraction (coagulation) bath containing a 20% aqueous phosphoric acid solution maintained at 20±2° C. The yarn was washed with ion exchange water in a second extraction bath, immersed in a 0.1N sodium hydroxide solution to allow for neutralization. The yarn was washed with water in a water washing bath, wound up and dried in a drying oven at 80° C. Where necessary, the dried fiber was heat treated at a temperature 600° C., tension of 7.0 g/d for 1.4 sec. The results are shown in Table 1.

TABLE 1

| | | Carbon nanotube | | | Fiber properties | | |
|---|---|---|---|---|---|---|---|
| | Heat treatment | Amount added % | Outer diameter nm | Length μm | Fiber strength GPa | Elastic modulus GPa | Compression strength GPa |
| Com. Ex. 1 | None | 0.0 | 14.1 | 4.2 | 5.8 | 178 | 0.35 |
| Com. Ex. 2 | Yes | 0.0 | 14.1 | 4.2 | 5.8 | 283 | 0.34 |
| Ex. 1 | None | 5.1 | 14.1 | 4.2 | 5.7 | 177 | 0.71 |
| Ex. 2 | None | 9.2 | 14.1 | 4.2 | 5.4 | 176 | 0.98 |
| Ex. 3 | None | 13.8 | 14.1 | 4.2 | 5.5 | 183 | 0.75 |
| Com. Ex. 3 | None | 17.9 | 14.1 | 4.2 | 5.6 | 184 | 0.41 |
| Com. Ex. 4 | None | 9.2 | 0.3 | 4.2 | 5.3 | 175 | 0.38 |
| Ex. 6 | None | 9.2 | 9.4 | 4.2 | 5.4 | 178 | 1.34 |
| Ex. 7 | None | 9.2 | 17.3 | 4.2 | 5.9 | 189 | 0.96 |
| Com. Ex. 5 | None | 9.2 | 24.4 | 4.2 | 5.7 | 187 | 0.35 |
| Com. Ex. 6 | None | 9.2 | 14.1 | 0.41 | 5.8 | 183 | 0.39 |
| Ex. 8 | None | 9.2 | 14.1 | 8.1 | 5.3 | 185 | 1.24 |
| Com. Ex. 7 | None | 9.2 | 14.1 | 12.3 | 5.4 | 180 | 0.42 |
| Ex. 9 | Yes | 9.2 | 9.4 | 4.2 | 5.4 | 281 | 1.64 |

Examples 1–9

Fibers were prepared by the same method as in Comparative Example 1 except that carbon nanotube was added along with the materials of polybenzazole fiber, uniformly mixed in advance and then the dope was polymerized. The uniformity of mixing was visually judged. That is, the mixture was stirred until the black color of carbon nanotube became uniform. To increase elastic modulus, the dried fiber was treated at a temperature 600° C., tension of 7.0 g/d for 1.4 sec as necessary. The results are shown in Table 1.

From the above-mentioned Table 1, it is appreciated that the fibers of the present invention showed striking increase in the strength as well as compression strength as compared to conventional fibers, and were extremely superior in physical properties. It is also observed simultaneously that they had a specific fine structure.

INDUSTRIAL APPLICABILITY

According to the present invention, a polybenzazole fiber having a specific fine fiber structure, and conventionally unavailable high strength and high elastic modulus at the same time can be industrially produced with ease, and a great effect of increasing the practical utility as an industrial material and expanding the fields of utilization can be afforded. Particularly, taking note of its high compression characteristic, its use as a composite material for aircraft materials and space exploitation can be expected. Furthermore, the fiber can be used for a wide range of uses, inclusive of tension members such as cable, electric wire, optical fiber and the like, tendon such as rope and the like, aviation and space materials such as rocket insulation, rocket casing, pressure container, string of space suit, planet probe balloon and the like; impact resistant materials such as bulletproof material and the like; cutproof materials such as gloves and the like; heat resistant flame resistant materials such as fire resistant suit, heat resistant felt, gasket for plant, heat resistant knit fabric, various sealings, heat resistant cushion, filter and the like; rubber reinforcing materials for belt, tire, sole, rope, hose and the like; sport-related materials such as fishing line, fishing rod, tennis racket, table tennis racket, badminton racket, golf shaft, club head, gut, string, sail cloth, athletic (running) shoes, spiked shoes, athletic bicycle and wheel thereof, spoke, braking wire, transmission wire, sports-specific (running) wheelchair and wheel thereof, ski, stock, helmet and the like; friction resistant materials such as advance belt, clutch facing and the like; reinforcing members for various building materials; and various other uses such as rider suit, speaker cone, lightweight baby carriage, lightweight wheelchair, lightweight medical care bed, life boat, life jacket and the like.

What is claimed is:

1. A polybenzazole fiber comprising a carbon nanotube inside the fiber.

2. The polybenzazole fiber of claim 1, wherein the content of the carbon nanotube is 1–15% in weight proportion.

3. The polybenzazole fiber of claim 1, wherein the carbon nanotube has an outer diameter of not more than 20 nm and a length of 0.5 $\mu$m –10 $\mu$m.

4. The polybenzazole fiber of claim 1, wherein the Raman shift factor ascribed to $A_{1g}$ of the carbon nanotube is not more than $-0.5$ cm$^{-1}$/GPa.

5. The polybenzazole fiber of claim 1, wherein the compression strength is not less than 0.5 GPa.

* * * * *